(12) United States Patent  
Wang (10) Patent No.: US 9,612,749 B2
(45) Date of Patent: Apr. 4, 2017

(54) OPPORTUNISTIC ASYNCHRONOUS DEDUPLICATION USING AN IN-MEMORY CACHE

(71) Applicant: VMware, Inc., Palo Alto, CA (US)

(72) Inventor: Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 140 days.

(21) Appl. No.: 14/716,832

(22) Filed: May 19, 2015

(65) Prior Publication Data

US 2016/0342338 A1 Nov. 24, 2016

(51) Int. Cl.
*G06F 13/00* (2006.01)
*G06F 3/06* (2006.01)
*G06F 12/0877* (2016.01)

(52) U.S. Cl.
CPC ............ *G06F 3/0608* (2013.01); *G06F 3/067* (2013.01); *G06F 3/0641* (2013.01); *G06F 3/0656* (2013.01); *G06F 3/0659* (2013.01); *G06F 12/0877* (2013.01); *G06F 2212/1041* (2013.01); *G06F 2212/222* (2013.01); *G06F 2212/254* (2013.01)

(58) Field of Classification Search
CPC ............ G06F 11/1448; G06F 11/1453; G06F 11/2061; G06F 11/2074
See application file for complete search history.

(56) References Cited

U.S. PATENT DOCUMENTS

| | | | |
|---|---|---|---|
| 2015/0106345 A1* | 4/2015 | Trimble | G06F 17/30156 707/692 |
| 2015/0234710 A1* | 8/2015 | Berrington | G06F 11/1407 707/664 |
| 2016/0162509 A1* | 6/2016 | Berrington | G06F 17/30159 707/639 |
| 2016/0259591 A1* | 9/2016 | Arikawa | G06F 3/06 |

* cited by examiner

*Primary Examiner* — Sean D Rossiter (57) ABSTRACT

Examples perform asynchronous deduplication of storage, such as virtualized or physical disks. Incoming input/output (I/O) commands containing data are subdivided into blocks which are written both to storage and to an in-memory cache. As idle processing resources become available, deduplication is performed on the storage using the in-memory cache. In this manner, read operations from storage are avoided in favor of the read operations from the in-memory cache.

20 Claims, 7 Drawing Sheets

OPPORTUNISTIC ASYNCHRONOUS DEDUPLICATION USING AN IN-MEMORY CACHE

BACKGROUND

Some existing storage systems support asynchronous deduplication of storage. In some existing asynchronous deduplication methods, all data is initially written to storage. Subsequently, when idle processing resources are available, blocks of the data are read back and a hash of each block is calculated. Records are created to track the location of blocks in storage and how many times a given block is referenced. Those records are searched to determine if a block is a duplicate, and if so to delete the duplicate on storage, and adjust the records accordingly. Some of the records are organized as one or more key-value tables maintained in a content-based chunk store. In that example, the records are indexed by a hash of a block of the data (e.g., the hash of the block of data is the key), and the value associated with the hash of the block of data is the reference count for that block of data, and its address in storage (e.g., HashOfData is a key into <ReferenceCount, AddressOfData>).

Under some existing asynchronous deduplication systems, deduplication is performed on data in storage. Therefore, an additional read of the data in storage is needed to calculate the hash of the data, and then a search of the key-value table is performed and duplicates in storage are deleted. However, this consumes additional resources, as more input/output (I/O) operations are required.

In synchronous (e.g., in-line) deduplication, data is deduplicated before being written to storage. However, synchronous deduplication is not feasible in many instances due to processor-intensive computations required to implement synchronous deduplication.

BRIEF DESCRIPTION OF THE DRAWINGS

Corresponding reference characters indicate corresponding parts throughout the drawings.

DETAILED DESCRIPTION

Examples described herein provide for asynchronous deduplication of storage with less resource consumption than existing deduplication methods. In some examples, incoming input/output (I/O) commands containing data content to be written to storage are received by an I/O stack, main storage, or processor. The data content is divided into a plurality of blocks, which in some examples are four kilobyte (4 k) blocks of data. In some examples, an in-memory hash cache (IMHC) is created on the host computing device to store data as the same data is written to storage. If some of the data in the IMHC are to be overwritten, the old copy of the data are removed from the IMHC and the new version of the data is written to the IMHC. When idle CPU resources are available, or in some examples when the IMHC is full, hash values of individual blocks are calculated before evicting the oldest data out of the cache. The hash values are much smaller, thereby consuming less memory space. Aspects of the disclosure are opportunistic as deduplication is performed opportunistically based on the availability of idle processing resources.

Accelerating the data deduplication of physical storage using in-memory hash caching reduces the reads from physical storage required to properly index and deduplicate the data blocks. This conserves resources, as fewer reads from storage are required. Aspects of the disclosure conserve resources, at least because fewer writes, reads, and deletions are performed, less storage is used, and fewer processing resources are consumed. Aspects of the disclosure reduce I/O latency, as the latency of I/O commands from storage is greater than the latency of I/O commands from the IMHC.

Figure 1:
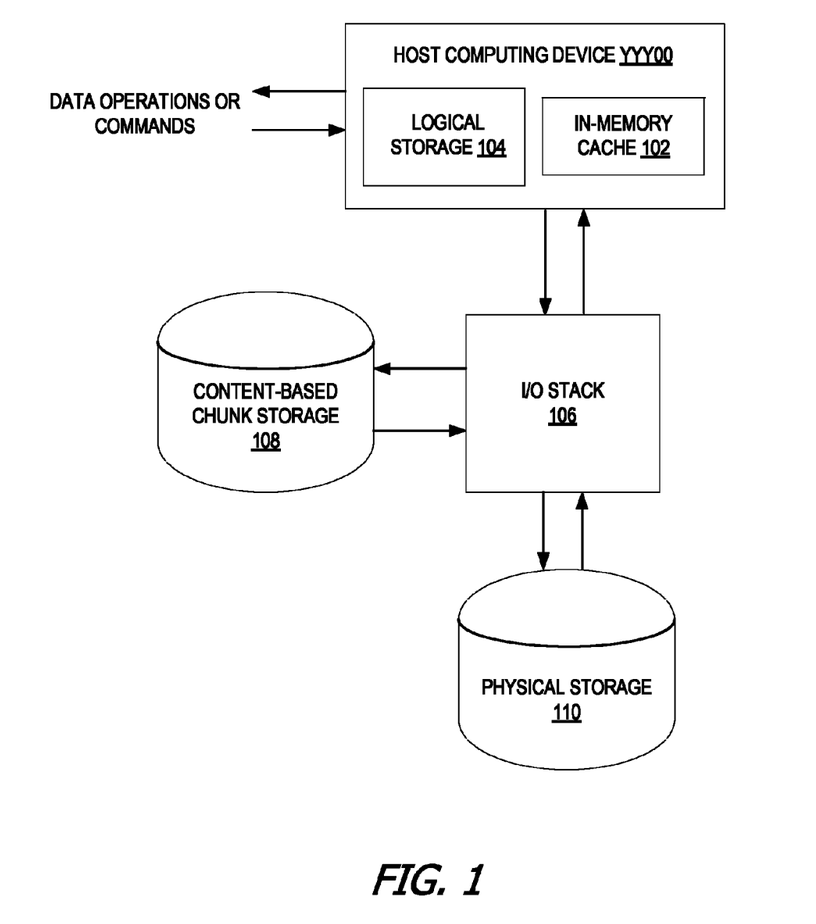
FIG. 1 is a block diagram of an example system for accelerating asynchronous data deduplication using opportunistic, in-memory hash caching.

FIG. 1 is a block diagram of an example system for accelerating asynchronous data deduplication using an in-memory hash cache. Data operations or commands come into a host computing device 601. The data operations or commands originate, in some examples, from a user 608, a virtual machine (VM) 735, an application 770, a guest operating system 765, a client, or any other source of data. The data operations or commands are, in some cases, a stream of input/output commands. The logical storage 104 represents the organizational structure of the data as an operating system views and organizes the data, in some examples, and any changes made to the data by the incoming data operations or commands are reflected in the logical storage 104. Also located in-memory on the host computing device 601 is an in-memory hash cache (IMHC) 102. As blocks of data are passed to through the system, they are simultaneously written to the IMHC 102. The IMHC 102 is, in some examples, flash storage. In other examples, the IMHC 102 is any other type of locally available.

Any data operations or commands which involve underlying stored data are passed to the I/O stack 106. In some examples, the I/O stack is virtualized, for example in the ESX server, by VMware, Inc. The I/O stack 106, in turn, communicates with the content-based chunk storage 108 (e.g., the chunk store). The chunk store 108, in turn, is in contact with the physical storage 110. In other examples, the physical storage 110 is virtualized. In some examples, the physical storage 110 is a virtual storage area network (vSAN) backed by a combination of solid state drives and/or magnetic or spinning disks. In other examples, the physical storage 110 may be virtual disks, virtual volumes, non-virtual storage, or any combination thereof. In some examples the physical storage 110 is cloud storage.

Figure 2:
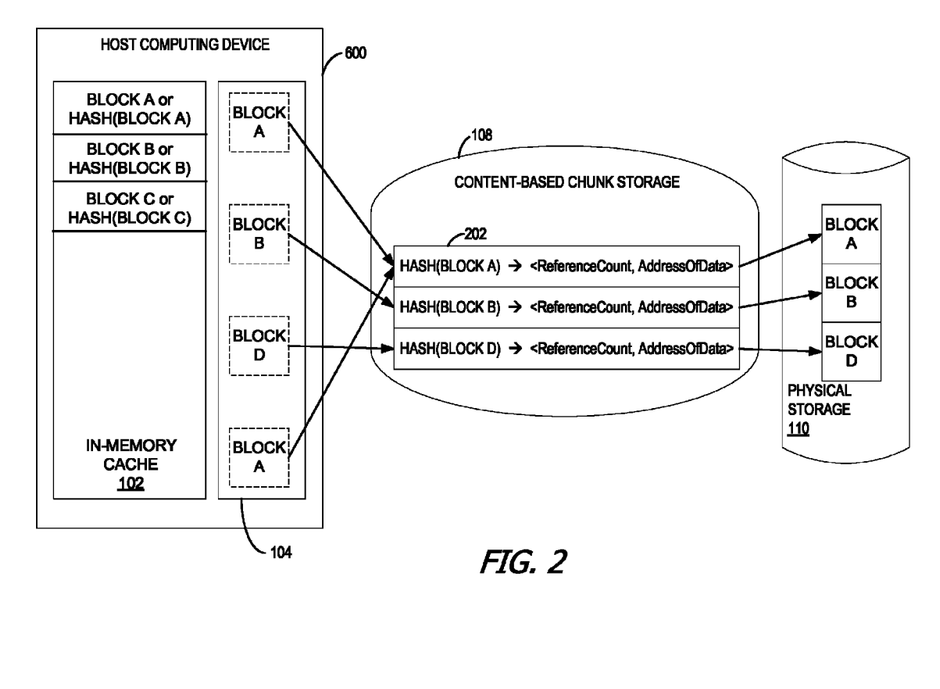
FIG. 2 is a block diagram of the logical, chunk-based, and physical storage elements of the system of FIG. 1.

FIG. 2 is a block diagram of the logical 104, content-based chunk storage 108, and physical storage 110 layers or elements. In some examples, these layers of storage are on the same host computing device 601. However, in other examples, each layer of storage may be housed separately, or some combination of the layers of storage may be housed together.

The logical storage 104 provides a user 608, application 770, guest operating system 765, virtual machine (VM) 235 or other element with an interface to the data maintained by the physical storage 110 layer. In some examples, no actual data blocks are maintained at the logical storage 104 layer. In that example, the logical storage 104 layer may be a table, database, graphical model, text-based representation, a hierarchical or network model, or any other representation of the storage relationships between data.

The IMHC 102 is stored in-memory on the host computing device 601. As data is written to physical storage 110, it is also written to the IMHC 102. The IMHC 102, in some examples, contains values for both the block of data and a hash of the block of data. Initially, an entry in the IMHC 102 will contain the block of data and a null value for its hash. As idle CPU resources become available, the hash of the block is calculated, and the data itself is evicted from the IMHC 102. Aspects of the disclosure using the IMHC 102 limits reads from the physical storage 110 to calculate the hash of data blocks, thereby conserving resources and making deduplication more efficient with lower latency.

The logical storage 104 layer is connected to a chunk store 108 layer. The chunk store 108 contains a table, database, index, or other collection of key-values, in the illustrated example a key-value table 202, representing data stored on the physical storage 110 layer and illustrated on the logical storage 104 layer. In some examples, the key is the hash of a block of data present on the physical storage 110 layer. In that example, the value associated with the key includes a reference counter and the address of the block of data on the storage layer. For example, the key-value of "Block A" visible on the logical storage 104 layer is hash(Block A), which points to <ReferenceCount, AddressOfData>.

As illustrated in FIG. 2, blocks which contain the same data content may be duplicated on the logical storage 104 layer; however, those duplicate blocks point to the same value in the key-value table 202 of the chunk store 108. For example, as illustrated, Block A is present twice in the logical storage 104 of FIG. 2; however, both instances of Block A point to the same entry in the key-value table 202 of the chunk store 108. In this example, the reference count of the hash of Block A is 2, since 2 entries on the logical storage 104 layer point to the entry of Block A in the key-value table 202.

The chunk store 108 is also connected to the physical storage 110. On the physical storage 110 level, each block represented on the logical storage 104 level is actually stored. In the present example, data is subdivided into 4 k blocks called "blocks". However, any subdivision or unit size of data is contemplated, including variable size blocks. The address of the blocks of data on the physical storage 110 level is stored by the key-value table 202 in the chunk store 108.

Figure 3:
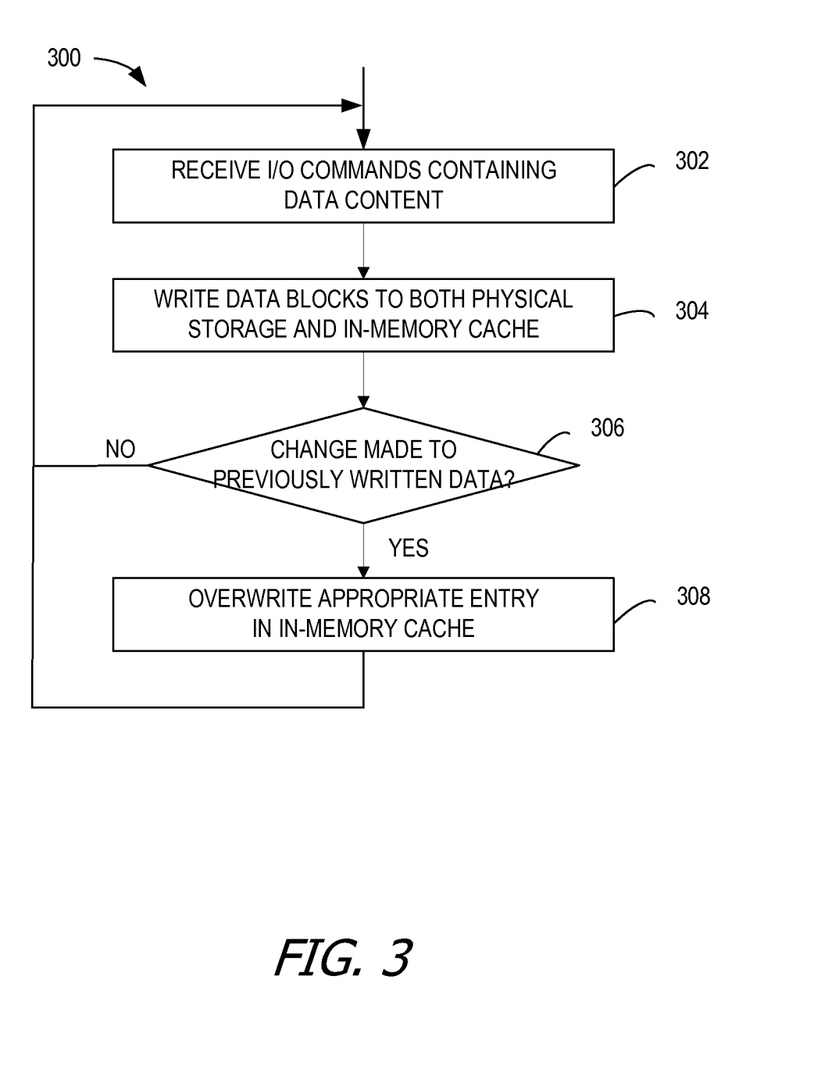
FIG. 3 is a flowchart of an example method of writing to an in-memory hash cache for deduplication.

FIG. 3 is a flowchart of an example method of in-line writes to the physical storage 110 and the IMHC 102, before deduplication begins. The operations illustrated in FIG. 3 are performed by a processor which, in some examples, operates on the I/O stack 106. At 302 a stream of I/O commands are received by the logical storage layer 104. In some examples, the I/O commands originate with a user 608, a virtual machine (VM) 735, an application 770, a guest operating system 765, a client, or any other source of I/O commands. The I/O commands contain data, data items, payload, content, etc. The stream of I/O commands are, in some examples, subdivided into blocks which are variable in size. In the present example, the blocks are 4 k in size.

At 304, the blocks are written into physical storage 110. As the blocks are written into physical storage 110, they are also written into the IMHC 102. An entry into the IMHC 102 includes the data block itself, and a hash of the data block. Initially, in some examples, the entry into the IMHC 102 will not include the hash of the data block. Instead the hash entry is initially a null value. To decrease latency and reduce memory consumption of IMHC 102, in some examples, the hash is calculated only when idle CPU resources are available. At this time, in some examples, no entry is created for them in the key-value table 202 located on the chunk store 108. At 306, if any changes are made to data written to the physical storage 110 the corresponding entry in the IMHC 102 is also updated or overwritten at 308.

Figure 4:
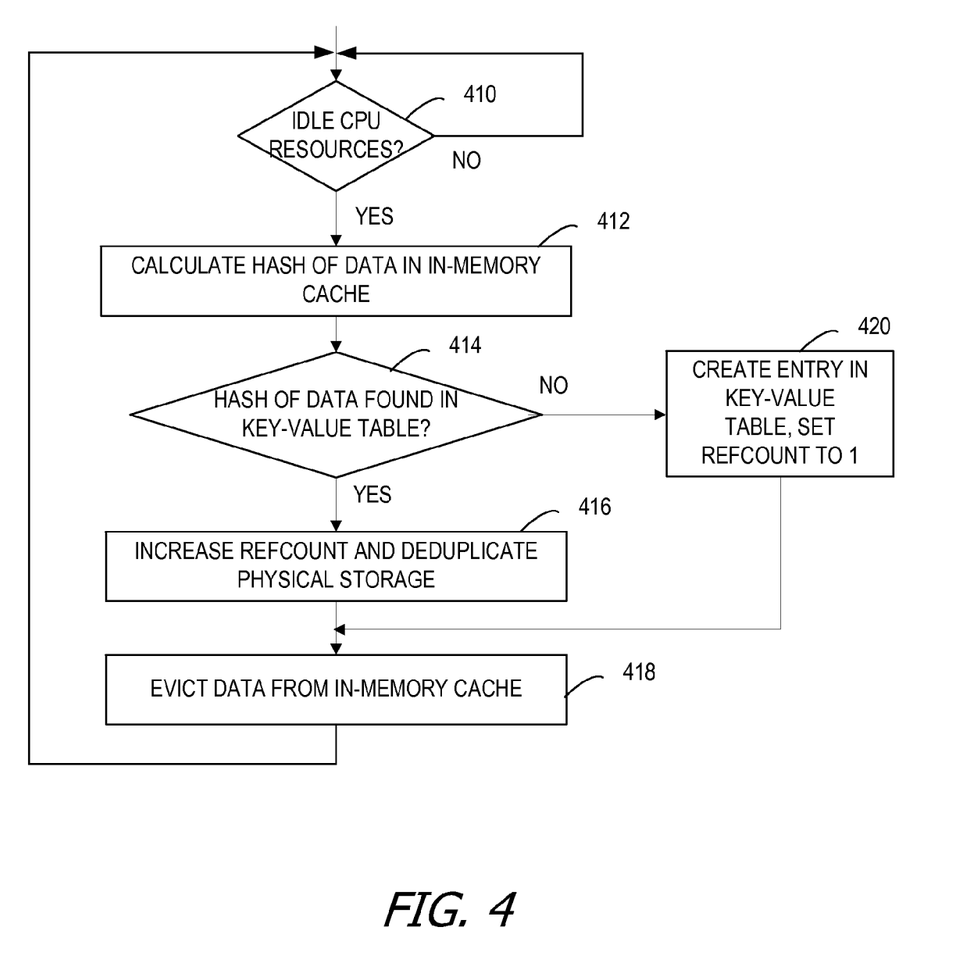
FIG. 4 is a flowchart of an example method of opportunistic asynchronous data deduplication using an in-memory hash cache.

FIG. 4 is a flowchart of an example method of opportunistic asynchronous data deduplication using an in-memory hash cache. The method leverages idle CPU resources to perform data deduplication asynchronously. In some examples, the operations illustrated in FIG. 4 and described below occur in the background, for instance as a background or deduplication thread. In some examples, the processor 602 associated with the I/O stack 106 performs the illustrated operations. In other examples, the deduplication thread executes separately from the I/O stack 106.

At 410, idle CPU resources are detected. Using the idle CPU resources, the hash of a block of data is calculated at 412. Use of any hash function is contemplated, such as SHA-256. In some examples, once the hash of the data block is calculated, the data itself is evicted from the IMHC 102. In that example, the hash is maintained, but the data block entry is set to null.

At 414 the key-value table 202 is searched. If the hash of the block of data is found or located in the key-value table 202, then the reference count of that entry is incremented by one at 416 and the duplicate data is evicted, deleted, overwritten, or otherwise deduplicated from the physical storage 110. However, if the hash of the block of data is not found in the key-value table 202 or the search otherwise fails, then a new entry is created in the key-value table 202 at 420. The new entry uses the hash as the key, the reference counter is set to 1, and the address of the block of data on physical storage 110 is inserted. In either case, once the key-value table 202 is updated, the block of data that was processed, and its corresponding entry in the IMHC 102, is evicted from the IMHC 102 at 418.

No read from physical storage 110 is required to perform the above operations, since the data is available in the IMHC 102. Relying on the IMHC 102 instead of physical storage 110 reduces the latency of the deduplication operations, in some examples.

Figure 5:
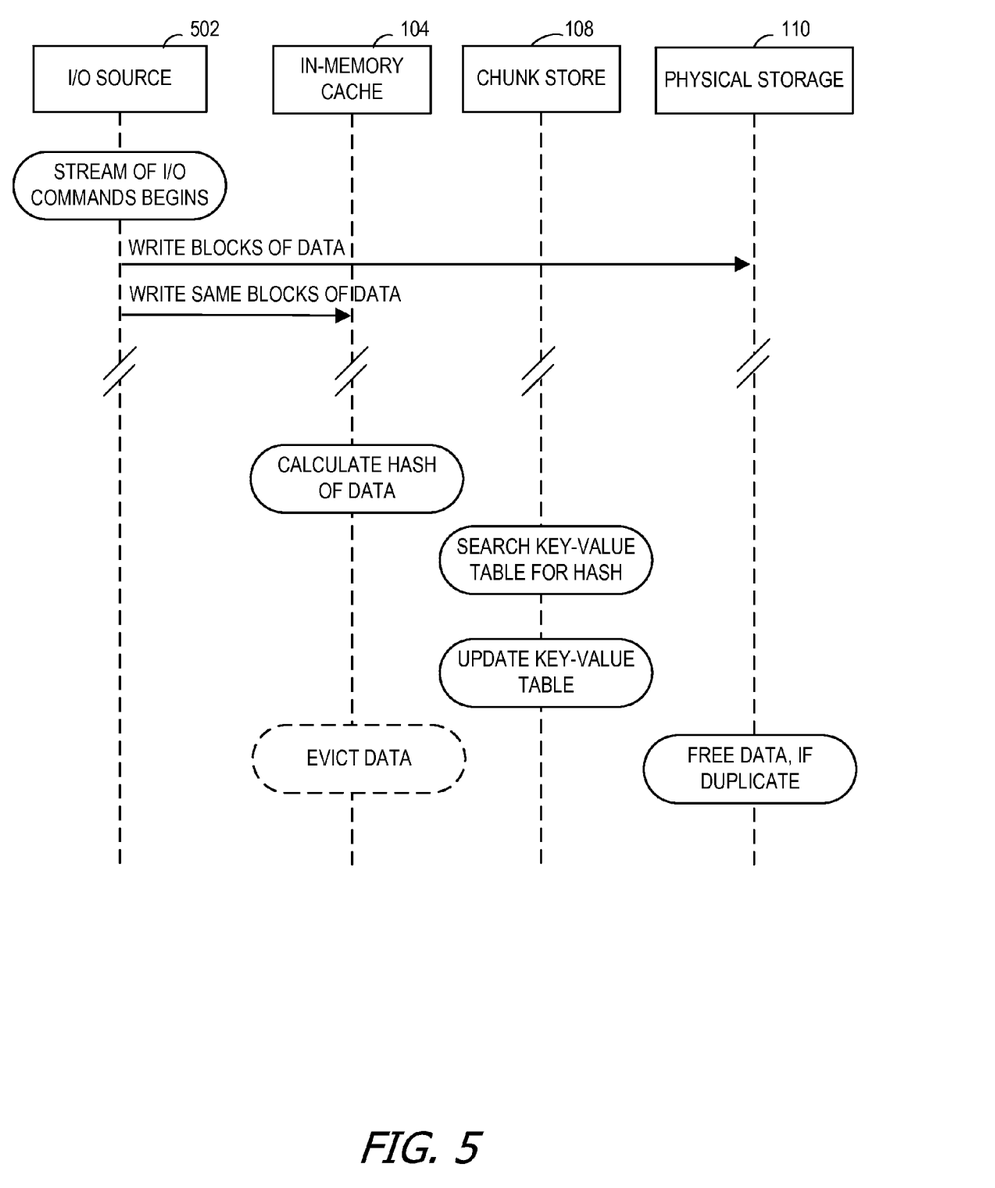
FIG. 5 is a sequence diagram illustrating an exemplary interaction between an input/output (I/O) source, an in-memory hash cache, a chunk store, and physical storage during deduplication using opportunistic hash caching.

FIG. 5 is a sequence diagram illustrating an exemplary interaction between the I/O source 502, the IMHC 102, the chunk store 108, and the physical storage 110 during deduplication using the IMHC 102. An I/O stream begins at the I/O source 502. The data contained in the I/O commands is transmitted to the chunk store 108 and to the physical storage 110 in blocks. In some examples, the blocks are 4 k chunks. However, any size blocks are contemplated. Transmission of data is continuous, in some examples.

When idle CPU resources later become available (or when it is time to start deduplicating the data recently written), the hash of individual blocks of data is calculated and stored on the IMHC 102. Once the hash is calculated for a block of data, that data is, in some examples, evicted from the IMHC 102. In some examples, once the hash is calculated its corresponding data block is immediately evicted. In other examples, the data block is not evicted from the IMHC 102 until the key-value table 202 is updated.

The key-value table 202 on the chunk store 108 is then searched for the hash of each block. The key-value table 202 is updated, based on whether the hash is located in the key-value table 202 or not. If the hash is not located in the key-value table 202 a new entry is created. The new entry uses the hash of the block of data as the key, and the corresponding value is the reference counter for that block of data and its corresponding address on the physical storage 110. The reference counter is initially set to one. However, if the hash is located in the key-value table 202 the reference counter is incremented by one. In the example where the hash is located in the key-value table 202, the duplicate data entry in the physical storage 110 is freed. In some examples, if the data was not already evicted from the IMHC 102 after calculated the hash, it is evicted after updating the key-value table 202. In some examples, the entire entry into the IMHC 102, both the data block and its corresponding hash, are evicted from the IMHC 102 after the key-value table 202 is updated.

Figure 6:
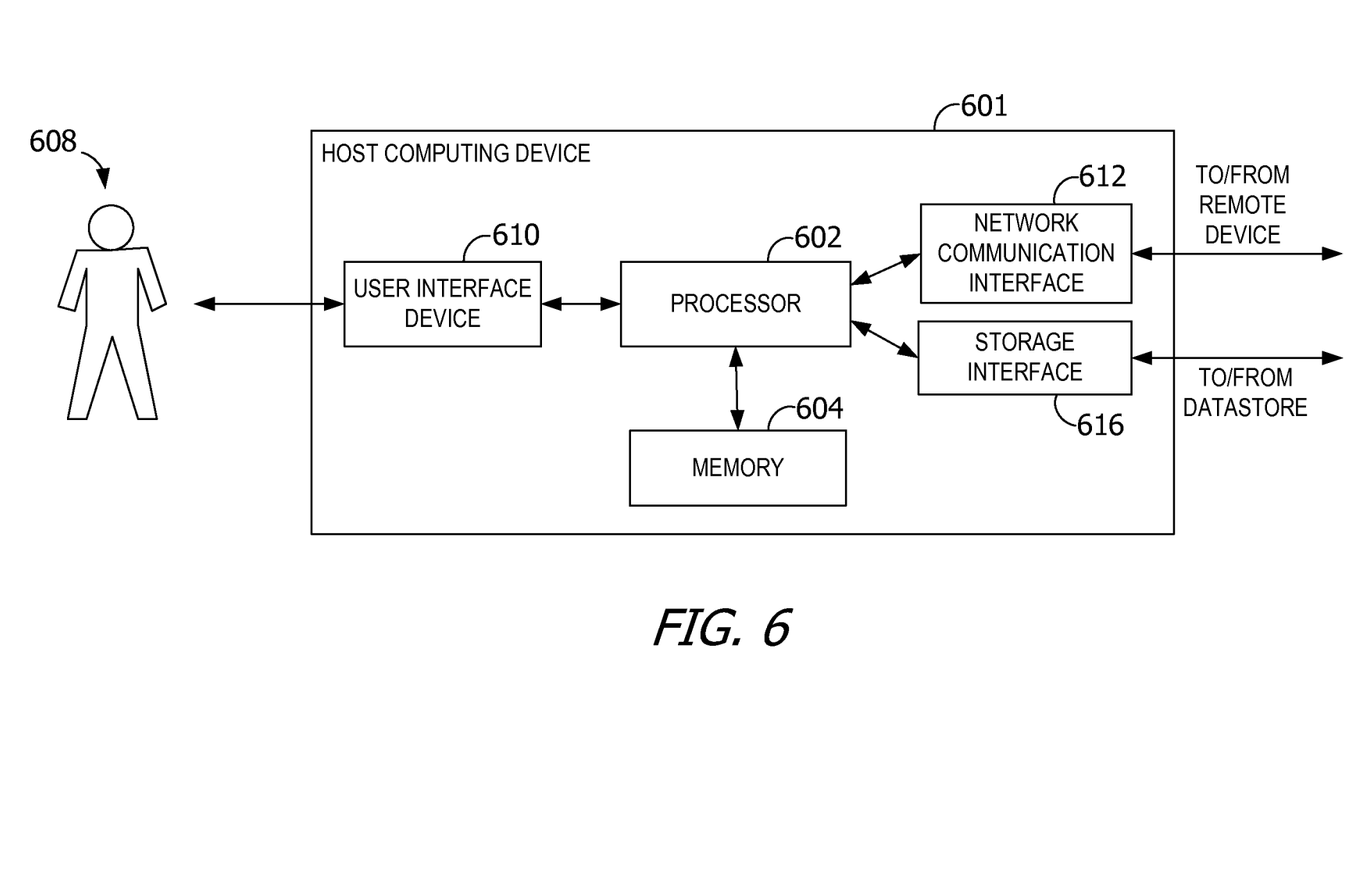
FIG. 6 is a block diagram of an example host computing device capable of housing one or more elements of a system performing deduplication using the in-memory hash cache.

FIG. 6 is a block diagram of an example host computing device 601. Host computing device 601 includes a processor 602 for executing instructions. In some examples, executable instructions are stored in a memory 604. Memory 604 is any device allowing information, such as executable instructions and/or other data, to be stored and retrieved. For example, memory 604 may include one or more random access memory (RAM) modules, flash memory modules, hard disks, solid state disks, and/or optical disks.

Host computing device 601 may include a user interface device 610 for receiving data from a user 608 and/or for presenting data to user 608. User 608 may interact indirectly with host computing device 601 via another computing device such as VMware's vCenter Server or other management device. User interface device 610 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 610 operates to receive data from user 608, while another device (e.g., a presentation device) operates to present data to user 608. In other examples, user interface device 610 has a single component, such as a touch screen, that functions to both output data to user 608 and receive data from user 608. In such examples, user interface device 610 operates as a presentation device for presenting information to user 608. In such examples, user interface device 610 represents any component capable of conveying information to user 608. For example, user interface device 610 may include, without limitation, a display device (e.g., a liquid crystal display (LCD), organic light emitting diode (OLED) display, or "electronic ink" display) and/or an audio output device (e.g., a speaker or headphones). In some examples, user interface device 610 includes an output adapter, such as a video adapter and/or an audio adapter. An output adapter is operatively coupled to processor 602 and configured to be operatively coupled to an output device, such as a display device or an audio output device.

Host computing device 601 also includes a network communication interface 612, which enables host computing device 601 to communicate with a remote device (e.g., another computing device) via a communication medium, such as a wired or wireless packet network. For example, host computing device 601 may transmit and/or receive data via network communication interface 612. User interface device 610 and/or network communication interface 612 may be referred to collectively as an input interface and may be configured to receive information from user 608.

Host computing device 601 further includes a storage interface 616 that enables host computing device 601 to communicate with one or more datastores, which store virtual disk images, software applications, and/or any other data suitable for use with the methods described herein. In example examples, storage interface 616 couples host computing device 601 to a storage area network (SAN) (e.g., a Fibre Channel network) and/or to a network-attached storage (NAS) system (e.g., via a packet network). The storage interface 616 may be integrated with network communication interface 612.

Figure 7:
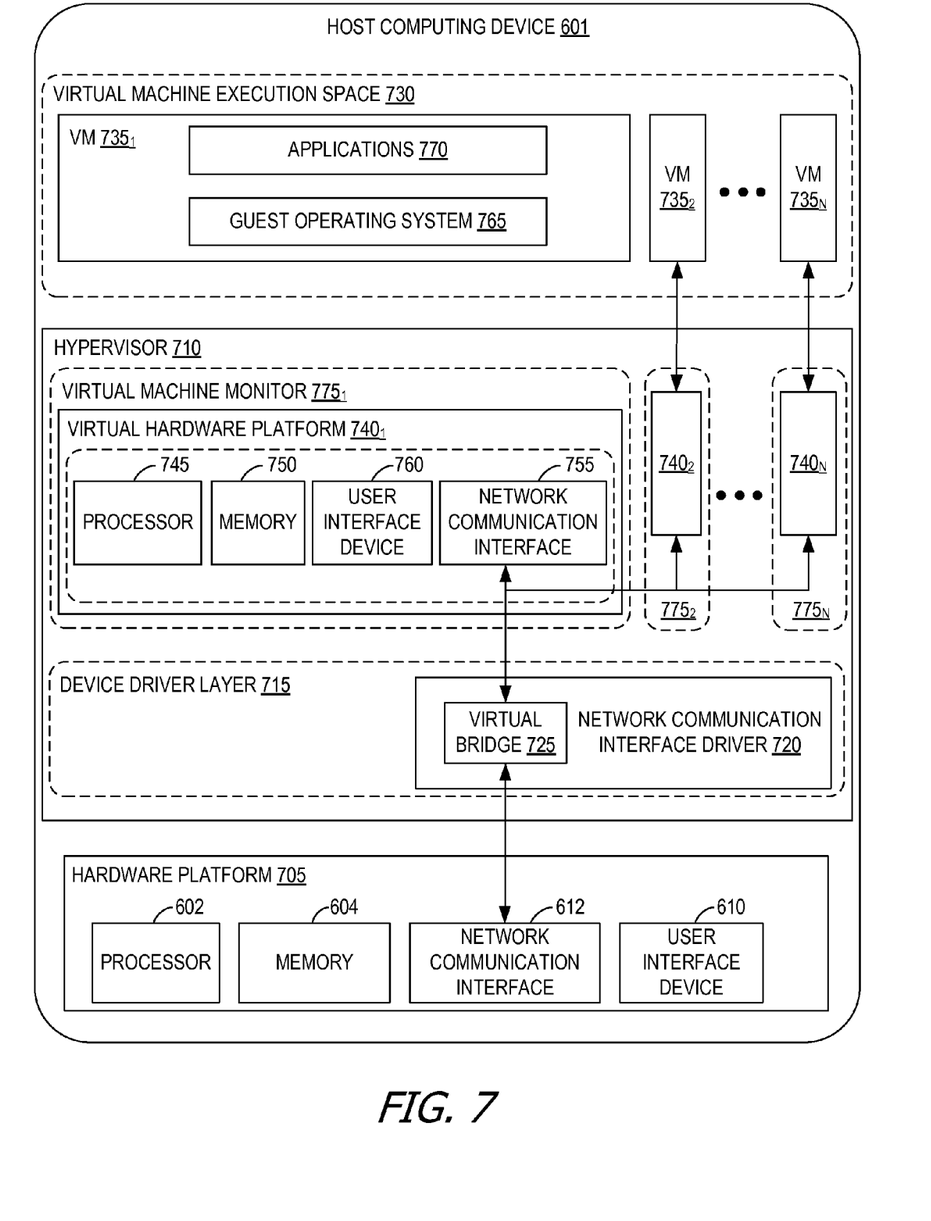
FIG. 7 is a block diagram of virtual machines for implementing an example of deduplication using the in-memory hash cache.

FIG. 7 depicts a block diagram of virtual machines $735_1$, $735_2 \ldots 735_N$ that are instantiated on host computing device 601. Host computing device 601 includes a hardware platform 705, such as an x86 architecture platform. Hardware platform 705 may include processor 602, memory 604, network communication interface 612, user interface device 610, and other input/output (I/O) devices, such as a presentation device 606 (shown in FIG. 6). A virtualization software layer, also referred to hereinafter as a hypervisor 710, is installed on top of hardware platform 705.

The virtualization software layer supports a virtual machine execution space 730 within which multiple virtual machines (VMs $735_1$-$735_N$) may be concurrently instantiated and executed. Hypervisor 710 includes a device driver layer 715, and maps physical resources of hardware platform 705 (e.g., processor 602, memory 604, network communication interface 612, and/or user interface device 610) to "virtual" resources of each of VMs $735_1$-$735_N$ such that each of VMs $735_1$-$735_N$ has its own virtual hardware platform (e.g., a corresponding one of virtual hardware platforms $740_1$-$740_N$), each virtual hardware platform having its own emulated hardware (such as a processor 745, a memory 750, a network communication interface 755, a user interface device 760 and other emulated I/O devices in VM $735_1$). Hypervisor 710 may manage (e.g., monitor, initiate, and/or terminate) execution of VMs $735_1$-$735_N$ according to policies associated with hypervisor 710, such as a policy specifying that VMs $735_1$-$735_N$ are to be automatically restarted upon unexpected termination and/or upon initialization of hypervisor 710. In addition, or alternatively, hypervisor 710 may manage execution VMs $735_1$-$735_N$ based on requests received from a device other than host computing device 601. For example, hypervisor 710 may receive an execution instruction specifying the initiation of execution of first VM $735_1$ from a management device via network communication interface 612 and execute the execution instruction to initiate execution of first VM $735_1$.

In some examples, memory 750 in first virtual hardware platform $740_1$ includes a virtual disk that is associated with or "mapped to" one or more virtual disk images stored on a disk (e.g., a hard disk or solid state disk) of host computing device 601. The virtual disk image represents a file system (e.g., a hierarchy of directories and files) used by first VM $735_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 715 includes, for example, a communication interface driver 720 that interacts with network communication interface 612 to receive and transmit data from, for example, a local area network (LAN) connected to host computing device 601. Communication interface driver 720 also includes a virtual bridge 725 that simulates the broadcasting of data packets in a physical network received from one communication interface (e.g., network communication interface 612) to other communication interfaces (e.g., the virtual communication interfaces of VMs $735_1$-$735_N$). Each virtual communication interface for each VM $735_1$-$735_N$, such as network communication interface 755 for first VM 7351, may be assigned a unique virtual Media Access Control (MAC) address that enables virtual bridge 725 to simulate the forwarding of incoming data packets from network communication interface 612. In an example, network communication interface 612 is an Ethernet adapter that is configured in "promiscuous mode" such that all Ethernet packets that it receives (rather than just Ethernet packets addressed to its own physical MAC address) are passed to virtual bridge 725, which, in turn, is able to further forward the Ethernet packets to VMs $735_1$-$735_N$. This configuration enables an Ethernet packet that has a virtual MAC address as its destination address to properly reach the VM in host computing device 601 with a virtual communication interface that corresponds to such virtual MAC address.

Virtual hardware platform $740_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 765 in order to execute applications 770 for an instantiated VM, such as first VM $735_1$. Virtual hardware platforms $740_1$-$740_N$ may be considered to be part of virtual machine monitors (VMM) $775_1$-$775_N$ that implement virtual system support to coordinate operations between hypervisor 710 and corresponding VMs $735_1$-$735_N$. Those with ordinary skill in the art will recognize that the various terms, layers, and categorizations used to describe the virtualization components in FIG. 7 may be referred to differently without departing from their functionality or the spirit or scope of the disclosure. For example, virtual hardware platforms $740_1$-$740_N$ may also be considered to be separate from VMMs $775_1$-$775_N$, and VMMs $775_1$-$775_N$ may be considered to be separate from hypervisor 710. One example of hypervisor 710 that may be used in an example of the disclosure is included as a component in VMware's ESX brand software, which is commercially available from VMware, Inc.

Example Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Example computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an example computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute exemplary means for asynchronous deduplication of storage using an in-memory cache. For example, the elements illustrated in FIGS. 1, 2, 6 and/or 7, such as when encoded to perform the operations illustrated in FIGS. 3, 4, and/or 5, constitute exemplary means for receiving, by a computing device, a plurality of I/O commands, exemplary means for writing the plurality of blocks both to storage and to the in-memory cache, and exemplary means for subsequently performing asynchronous deduplication of the storage using the in-memory cache.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "example" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

I claim:

1. A method for asynchronous deduplication of storage using an in-memory hash cache, said method comprising:
   receiving, by a computing device, a plurality of input/output (I/O) commands, said plurality of commands including content subdivided into a plurality of blocks of data;
   writing the plurality of blocks both to storage and to the in-memory hash cache prior to performing asynchronous deduplication; and
   subsequently performing asynchronous deduplication of the storage using the in-memory hash cache while the plurality of blocks is stored in both the storage and the in-memory hash cache.

2. The method of claim 1, wherein performing the asynchronous deduplication occurs upon availability of processing resources associated with the computing device.

3. The method of claim 1, wherein performing the asynchronous deduplication occurs without performing read operations on the storage.

4. The method of claim 1, wherein performing the asynchronous deduplication comprises:
   calculating a hash of the blocks from the in-memory hash cache;
   determining whether the calculated hash is available within a chunk store; and
   updating a key-value table associated with the chunk store based on the determining.

5. The method of claim 4, wherein updating the key-value table further comprises searching the key-value table for the calculated hash of the block.

6. The method of claim 5, wherein updating the key-value table further comprises inserting the hash of the block as a key into the key-value table, and inserting a reference counter and an address of the block in the storage as the associated value of that key in the key-value table, upon the search failing to locate the hash in the key-value table.

7. The method of claim 4, wherein updating the key-value table further comprises incrementing a reference counter of the hash of the block upon the search locating the hash in the key-value table.

8. The method of claim 4, further comprising inserting a calculated hash of the blocks into the in-memory hash cache upon availability of the processing resources.

9. The method of claim 4, wherein calculating the hash of the blocks is performed without reading the blocks from storage.

10. A non-transitory computer readable storage medium having stored thereon computer software executable by a processor, the computer software embodying a method for asynchronous deduplication of storage using an in-memory hash cache by:
    receiving, by a computing device, a plurality of input/output (I/O) commands, said plurality of commands including content subdivided into a plurality of blocks of data;
    writing the plurality of blocks both to storage and to the in-memory hash cache prior to performing opportunistic asynchronous deduplication; and
    subsequently performing, while the plurality of blocks is stored in both the storage and the in-memory hash cache, opportunistic asynchronous deduplication of the storage using the in-memory hash cache upon availability of processing resources.

11. The non-transitory computer readable storage medium of claim 10, wherein the computer software, upon execution, further evicts blocks from the in-memory hash cache after calculating a hash of those blocks.

12. The non-transitory computer readable storage medium of claim 10, wherein the computer software, upon execution, performs the opportunistic deduplication without performing read operations on the storage.

13. The non-transitory computer readable storage medium of claim 10, wherein the computer software, upon execution, evicts blocks from the in-memory hash cache when the in-memory hash cache is full.

14. A system for asynchronous deduplication of storage using an in-memory hash cache, said system comprising:
    an in-memory hash cache of a computing device;
    an input/output (I/O) stack of the computing device, the I/O stack programmed to:
    receive a plurality of I/O commands, said plurality of commands including content subdivided into a plurality of blocks of data; and
    write the plurality of blocks both to storage and to the in-memory hash cache prior to performing opportunistic asynchronous deduplication, the storage being remote from the computing device; and
    a deduplication thread executing on the computing device to perform, while the plurality of blocks is stored in both the storage and the in-memory hash cache, opportunistic asynchronous deduplication of the storage using the in-memory hash cache upon availability of processing resources associated with the computing device.

15. The system of claim 14, wherein a latency for accessing the in-memory hash cache is less than a latency for accessing the storage.

16. The system of claim 14, wherein the in-memory hash cache stores the plurality of blocks and hashes of the plurality of blocks.

17. The system of claim 14, further comprising a memory area storing a key-value table, the key-value table including hashes of the plurality of blocks, a reference counter, and an address, in storage, of the plurality of blocks.

18. The system of claim 14, wherein the in-memory hash cache is flash memory and the storage is cloud storage.

19. The system of claim 14, wherein the deduplication thread executes to perform opportunistic asynchronous deduplication by accessing the plurality of blocks from the in-memory hash cache instead of from the storage.

20. The system of claim 14, wherein the deduplication thread executes separately from the I/O stack.

* * * * *